(12) United States Patent
Goettker

(10) Patent No.: US 8,276,933 B2
(45) Date of Patent: Oct. 2, 2012

(54) SELF-LATCHING TRAILER COUPLER

(76) Inventor: Bernhardt P. Goettker, Valley Center, CA (US)

( * ) Notice: Subject to any disclaimer, the term of this patent is extended or adjusted under 35 U.S.C. 154(b) by 215 days.

(21) Appl. No.: 12/753,877

(22) Filed: Apr. 3, 2010

(65) Prior Publication Data
US 2011/0241312 A1 Oct. 6, 2011

(51) Int. Cl.
*B60D 1/06* (2006.01)
(52) U.S. Cl. .................. 280/513; 280/508; 280/511
(58) Field of Classification Search .................. 280/508, 280/510, 511, 513
See application file for complete search history.

(56) References Cited

U.S. PATENT DOCUMENTS

| | | | | |
|---|---|---|---|---|
| 2,090,113 A * | 8/1937 | Dayton | ................ | 280/513 |
| 2,113,338 A * | 4/1938 | Wohldorf | ................ | 280/508 |
| 2,143,322 A * | 1/1939 | Knobel, Jr. | ................ | 280/513 |
| 2,166,208 A * | 7/1939 | Dayton | ................ | 280/513 |
| 2,219,955 A * | 10/1940 | Gilmore | ................ | 280/511 |
| 2,363,755 A * | 11/1944 | Smith | ................ | 280/512 |
| 2,377,368 A * | 6/1945 | Polstra | ................ | 280/513 |
| 2,439,967 A * | 4/1948 | Dollase | ................ | 280/513 |
| 2,542,643 A * | 2/1951 | Duncan | ................ | 280/513 |
| 2,726,099 A * | 12/1955 | Nunn, Jr. | ................ | 280/512 |
| 2,732,222 A * | 1/1956 | Harroun | ................ | 280/512 |
| 2,732,224 A * | 1/1956 | Deebel | ................ | 280/513 |
| 3,139,291 A * | 6/1964 | Geresy | ................ | 280/507 |
| 3,237,969 A * | 3/1966 | Geresy | ................ | 280/507 |
| 3,888,517 A * | 6/1975 | Ray | ................ | 280/512 |
| 4,225,261 A * | 9/1980 | Marx | ................ | 403/122 |
| 4,527,925 A * | 7/1985 | Bauer et al. | ................ | 403/143 |
| 5,344,174 A * | 9/1994 | Sanders | ................ | 280/504 |
| 5,632,501 A * | 5/1997 | Jackson et al. | ................ | 280/508 |
| 5,887,885 A * | 3/1999 | Byers et al. | ................ | 280/512 |
| 6,481,738 B1 * | 11/2002 | Duncan et al. | ................ | 280/422 |
| 6,505,849 B1 | 1/2003 | Ebey | | |
| 6,595,540 B1 | 7/2003 | MacKarvich | | |
| 6,811,176 B2 * | 11/2004 | Brown et al. | ................ | 280/512 |
| 6,869,095 B2 | 3/2005 | Roll | | |
| 7,007,967 B2 | 3/2006 | Goettker | | |
| 2009/0033062 A1 | 2/2009 | Goettker | | |
| 2009/0115166 A1 | 5/2009 | Goettker | | |

\* cited by examiner

*Primary Examiner* — Tashiana Adams
*Assistant Examiner* — Maurice Williams
(74) *Attorney, Agent, or Firm* — Rodney F. Brown

(57) ABSTRACT

A self-latching trailer coupler has a fixed body, a displaceable slide and a biasing member. The body includes a slide slot in which the slide is displaceable in reciprocating first and second displacement directions. The biasing member biases the slide in one of the displacement directions. A biasing chamber and a retention chamber are formed within a side of the slide. The biasing chamber has at least two sides enclosing the biasing member. The coupler additionally has a retention member attached to the body which extends into the biasing chamber and engages an end of the biasing member. The retention member further extends into the retention chamber to define the displacement limits of the slide.

18 Claims, 5 Drawing Sheets

SELF-LATCHING TRAILER COUPLER

BACKGROUND OF THE INVENTION

The present invention relates generally to an apparatus for coupling trailers and tow vehicles and, more particularly, to a self-latching coupler affixable to a trailer which has a spring-biased latch assembly facilitating coupling.

Light-weight utility trailers, such as boat trailers and the like, typically have a coupler which enables coupling of the trailer and an associated motorized tow vehicle. The coupler is commonly affixed to the front end of the trailer and is configured to engage a hitch mounted on the rear of the tow vehicle, such as an automobile, sport utility vehicle, light truck, or the like. The hitch is commonly a ball-shaped male member termed a hitch ball and the coupler is commonly a bowl-shaped female member, which receives the hitch ball. The coupler is often provided with a latch having an open and a closed position. The latch releasably secures the trailer and tow vehicle coupling when the hitch is received within the coupler. Exemplary prior art couplers and hitch balls are shown in U.S. Pat. No. 6,505,849 to Ebey and U.S. Patent Publication No. 2009/0115166 A1 to Goettker, both of which are incorporated herein by reference.

The coupler and hitch cooperatively enable a user to selectively couple the tow vehicle and trailer for the purpose of towing the trailer and its cargo to a desired location. The coupler and hitch also cooperatively enable a user to selectively uncouple the tow vehicle and trailer for the purpose of using the tow vehicle for motorized transport independent of the trailer and/or storing the trailer at a desired location.

The present invention recognizes a need for an improved coupler design. As such, it is generally an object of the present invention to provide a new design for a coupler, which effectively couples a trailer and a tow vehicle. More particularly, it is an object of the present invention to provide a coupler, which effectively secures the coupling between the coupler and a hitch when the hitch is received within the coupler. It is another object of the present invention to provide a coupler, which enables the user to easily transition the coupler between the open and closed positions as desired for uncoupling or coupling of the trailer and tow vehicle, respectively. It is another object of the present invention to provide a coupler, which enables the user to couple the trailer and tow vehicle by means of a self-latching procedure. It is still another object of the present invention to provide a simplified coupler having a relatively few number of parts. More particularly, it is an object of the present invention to provide a manually operated coupler having a manual finger pull integrally formed with a hitch-retaining slide which is displaceable within a fixed body of the coupler. It is yet another object of the present invention to provide a coupler having a stop catch integrally formed with a displaceable hitch-retaining slide which cooperates with a stop notch integrally formed with a fixed body to provide a displacement stop mechanism for the slide within the body.

These objects and others are accomplished in accordance with the invention described hereafter.

SUMMARY OF THE INVENTION

The present invention is a trailer coupler comprising a fixed body, a displaceable slide and a biasing member. A preferred slide has a finger pull integrally formed with the slide which is fixed relative to the slide. The body includes a slide slot in which the slide is displaceable in reciprocating first and second displacement directions. The biasing member biases the slide in the first or second displacement direction. A biasing chamber is formed within a side of the slide and is fixed relative to the slide. The biasing chamber has at least two biasing chamber sides which enclose the biasing member. A preferred biasing member is a coil spring having two ends and an external face which adjoins the at least two biasing chamber sides.

In accordance with a preferred embodiment, the biasing chamber sides are an end side defining an end face of the biasing chamber and a front side defining a front face of the biasing chamber. The end face engages one end of the biasing member and the front face adjoins the external face of the biasing member.

A preferred coupler further comprises a retention member which is attached to the body and which is fixed relative to the body. The retention member extends into the biasing chamber and engages the second end of the biasing member within the biasing chamber. A preferred retention member has a front end and a shaft. The shaft extends from the front end of the retention member into the biasing chamber where it engages the second end of the biasing member.

A preferred slide also has a retention chamber which is formed within the side of the slide and which is fixed relative to the slide. The retention chamber has a retention chamber end side. The front end of the retention member extends into the retention chamber and engages the retention chamber end side when the slide is displaced in the first displacement direction to a first displacement limit, thereby blocking further displacement of the slide in the first displacement direction. Alternatively or additionally, the front end engages the retention chamber end side when the slide is displaced in the second displacement direction to a second displacement limit, thereby blocking further displacement of the slide in the second displacement direction.

In accordance with a preferred embodiment, the first displacement direction is a downward displacement direction and the second displacement direction is an upward displacement direction. The retention chamber has a retention chamber top end side and a retention chamber bottom end side. The front end of the retention member engages the retention chamber top end side when the slide is displaced in the downward displacement direction to a downward displacement limit, thereby blocking further displacement of the slide in the downward displacement direction. The front end engages the retention chamber bottom end side when the slide is displaced in the upward displacement direction to an upward displacement limit, thereby blocking further displacement of the slide in the upward displacement direction.

A preferred coupler further comprises a first cooperative stop member integrally formed with the body and a second cooperative stop member integrally formed with the slide. The first and second stop members selectively engage one another to provide a displacement stop mechanism for the slide in the first or second displacement direction.

Another characterization of the present invention is method for coupling a trailer and a tow vehicle. The tow vehicle has a hitch and the trailer has a coupler which includes a fixed body, a displaceable slide and a biasing member. The fixed body has a slide slot and a hitch chamber. The slide is displaceable in reciprocating upward and downward displacement directions within the slide slot. The biasing member applies a downward biasing force to the slide in the downward displacement direction.

The method comprises positioning the slide in the hitch chamber by the downward biasing force of the biasing member and positioning the body over the hitch. The body is downwardly displaced onto the hitch such that an initial portion of the hitch enters the hitch chamber and engages the slide residing in the hitch chamber. The slide is displaced in the upward displacement direction against the downward biasing force by engagement of the slide with the initial portion of the hitch while continuing downward displacement of the body onto the hitch until a substantial portion of the hitch substantially greater than the initial portion enters the hitch chamber. The slide is released from displacement in the upward displacement direction when the substantial portion of the hitch enters the hitch chamber causing the downward biasing force to displace the slide in the downward displacement direction, thereby repositioning the slide in the hitch chamber and retaining the hitch in the hitch chamber.

The invention will be further understood from the accompanying drawings and description.

BRIEF DESCRIPTION OF THE DRAWINGS

Embodiments of the invention are illustrated by way of example and not by way of limitation in the above-recited figures of the drawings, wherein like reference characters indicate the same or similar elements.

DESCRIPTION OF PREFERRED EMBODIMENTS

Figure 1:
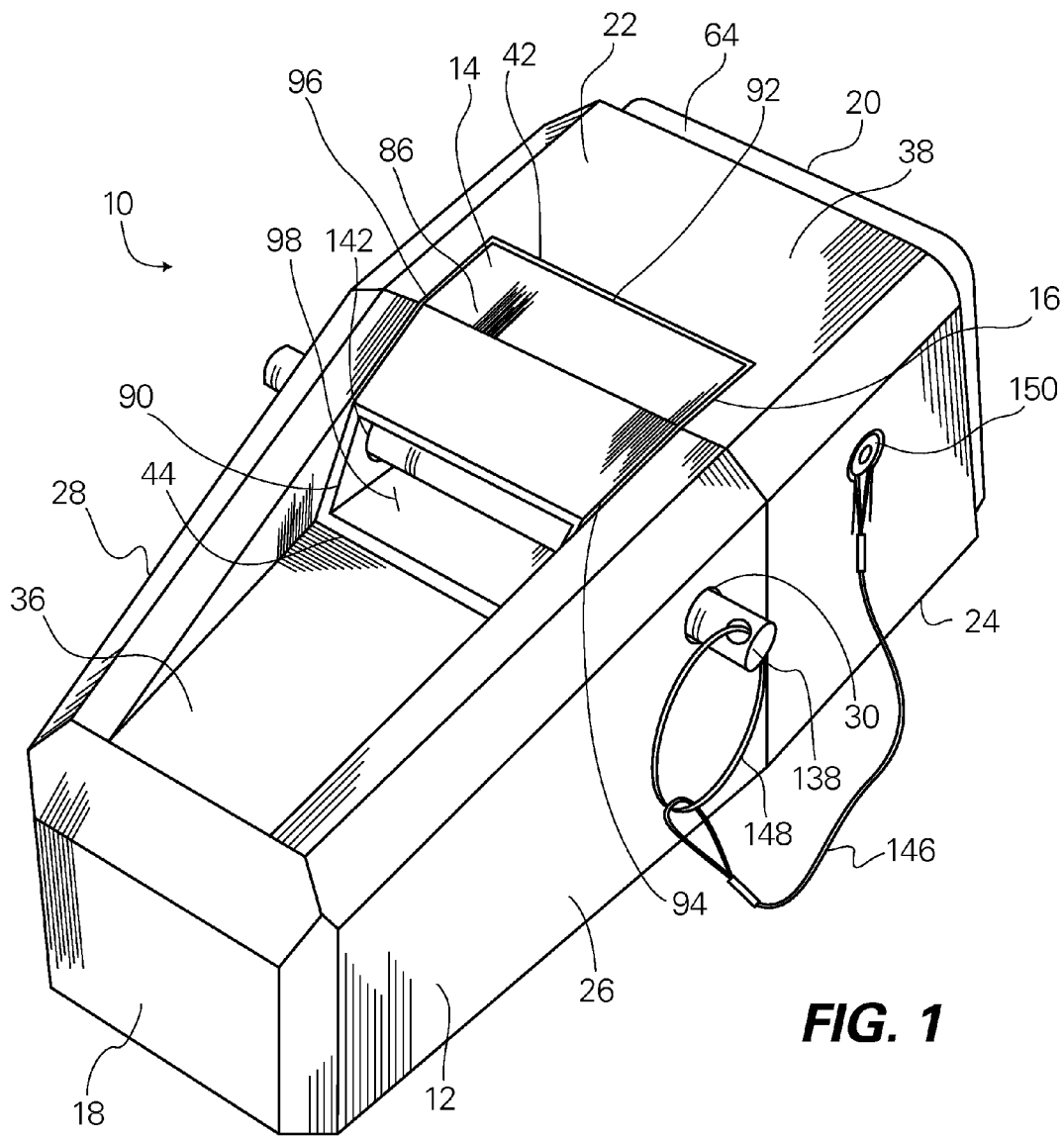
FIG. 1 is a front perspective view of a coupler of the present invention having a latch assembly in a closed position.

The present invention relates to a coupler for coupling or uncoupling of a trailer and a tow vehicle. Embodiments of the coupler of the present invention are described below.

Referring to FIGS. 1-5, an embodiment of the coupler of the present invention is shown and generally designated 10. The coupler 10 comprises a body 12 and a slide 14 which is nested within a slide slot 16 formed in the body 12 of the coupler 10. The body 12 and slide 14 are each preferably fabricated by casting, machining or otherwise shaping a high-strength metal to obtain a solid unitary structure in the configuration of the body 12 and another solid unitary structure in the configuration of the slide 14. A preferred material of fabrication for the body 12 and slide 14 is carbon steel or stainless steel.

The body 12 is termed a "fixed" element of the coupler 10, while the slide 14 is termed a "displaceable" element of the coupler 10. The terms "fixed" and "displaceable" are used herein to characterize the displacement capability of the body 12, slide 14, and other coupler elements relative to the main structure of a trailer on which the coupler 10 may be mounted in a manner described below. The body 12 of the coupler 10 is "fixed" because it does not substantially move relative to the trailer once the coupler 10 is mounted on the trailer. Conversely, the slide 14 is "displaceable" because it can be substantially moved relative to the trailer in a manner described below once the coupler 10 is mounted on the trailer.

The terms "front" and "rear" are also used herein to characterize the relative position of certain coupler elements with respect to the main structure of the trailer and an associated motorized vehicle which is employed to tow the trailer. A "rear" element is closer to the main structure of the trailer and farther from the tow vehicle. Conversely, a "front" element is farther from the main structure of the trailer and closer to the tow vehicle. The terms "top" or "upper" and "bottom" or "lower" are used herein to characterize the relative position of certain coupler elements with respect to the ground surface, typically a roadway or similar surface, which supports the trailer and tow vehicle. A "bottom" or "lower" element is closer to the ground surface. Conversely, a "top" or "upper" element is farther from the ground surface. The terms "inner" and "outer" are used herein to characterize the relative position of certain coupler elements with respect to the interior and exterior of the coupler. An "inner" element faces the interior of the coupler, while an "outer" element faces the exterior of the coupler.

The body 12 of the coupler 10 has an elongate configuration, wherein the elongate axis of the body 12 has a substantially horizontal orientation. The body 12 substantially resembles a rectangular box having six exterior sides. The exterior sides are a front end 18, a rear end 20, a top side 22, a bottom side 24, a first lateral side 26, and a second lateral side 28. The front end 18 is a substantially continuous vertically-oriented plate which defines a substantially enclosed front facade of the body 12. The first and second lateral sides 26, 28 are a pair of opposing substantially continuous vertically-oriented plates which define substantially enclosed opposing lateral facades of the body 12. However, a pair of correspondingly aligned first and second lock pin apertures 30, 32 extend through each lateral side 26, 28, respectively.

The top side 22 has a stepped facade which is defined by a substantially continuous horizontal lower plate 36, a substantially continuous horizontal upper plate 38 and a substantially continuous riser plate 40. The riser plate 40 is positioned between the lower and upper plates 36, 38 and extends downwardly from the front edge 42 of the upper plate 38 in a substantially vertical orientation. However, the riser plate 40 is preferably somewhat slanted at a slide angle slightly less than 90 degrees. The rectangular slide slot 16, which is positioned between the rear face 44 of the lower plate 36 and the front face 46 of the riser plate 40, provides a discontinuity in the facade of the top side 22. The front face 46 of the riser plate 40 has an upper stop notch 48 and a lower stop notch 50 formed therein above the lower plate 36. A female-threaded retention bore 52 also extends through the riser plate 40 at a level below the upper and lower stop notches 48, 50 and the lower plate 36.

The rear end 20 and bottom side 24 of the body 12 are substantially unenclosed (i.e., open), thereby exposing the substantially hollow interior 54 of the body 12 from behind and below. The riser plate 40 substantially extends the height of the hollow interior 54 from the top side 22 to the bottom side 24 of the body 12. As such, the riser plate 40 divides the hollow interior 54 into a front chamber, termed a hitch chamber 56, and a rear chamber 58. The hitch chamber 56 is substantially enclosed on its front side by the inner face 60 of the front plate 18, on its first lateral side by the inner face 61 of the first lateral side 26, on its second lateral side by the inner face 62 of the second lateral side 28, and on its top side by the inner face 63 of the lower plate 36, while the bottom side of the hitch chamber 56 remains substantially unenclosed or open. The inner faces 60, 61, 62, 63 all have correspondingly concave rounded configurations which merge together to define a continuous concave semispherical surface bounding the front, first and second lateral, and top sides of the hitch chamber 56.

The open rear end 20 of the body 12 is provided with a beveled male flange 64 around its substantially U-shaped rear edge. The flange 64 facilitates substantially fixed attachment of the body 12 to a trailer (not shown) by any suitable means known to the skilled artisan. In particular, the rear end 20 of the body 12 is typically fixably attached to a connective structure on the front end of a trailer such as a trailer tongue, a brake actuator, or the like. The connective structure of the trailer may have a female flange on its front edge, which is cooperatively configured in correspondence with the male flange 64 on the rear end 20 of the body 12, to receive the male flange 64 therein.

Fixed attachment of the body 12 to the connective structure of the trailer is preferably effected by substantially permanent means such as welding or the like. Exemplary fixed attachment of a coupler body to a trailer is shown and described in commonly-owned U.S. Patent Publication No. 2009/0033062 A1 to Goettker, which is incorporated herein by reference.

In accordance with an alternate embodiment of the coupler of the present invention, which is not shown in the drawing, the body of the coupler is integrally formed with the trailer. This embodiment is essentially identical to the coupler 10 shown and described above except that the rear end of the coupler body is integrally formed with the front end of the trailer such that the coupler body and front end of the trailer have one continuous unitary construction.

In any case, the coupler of the present invention, whether attached to or integral with the trailer, enables a practitioner to couple the trailer to a motorized tow vehicle in a manner described below. Once the practitioner has coupled the trailer and tow vehicle, the tow vehicle may be employed to transport the trailer and any cargo positioned in or on the trailer in accordance with any number of well-known applications. Although not a limitation, the coupler of the present invention preferably has specific utility to light-weight utility trailers for conventional applications such as hauling boats, personal watercraft, sport motorcycles, ATV's, snowmobiles and the like.

Figure 4:
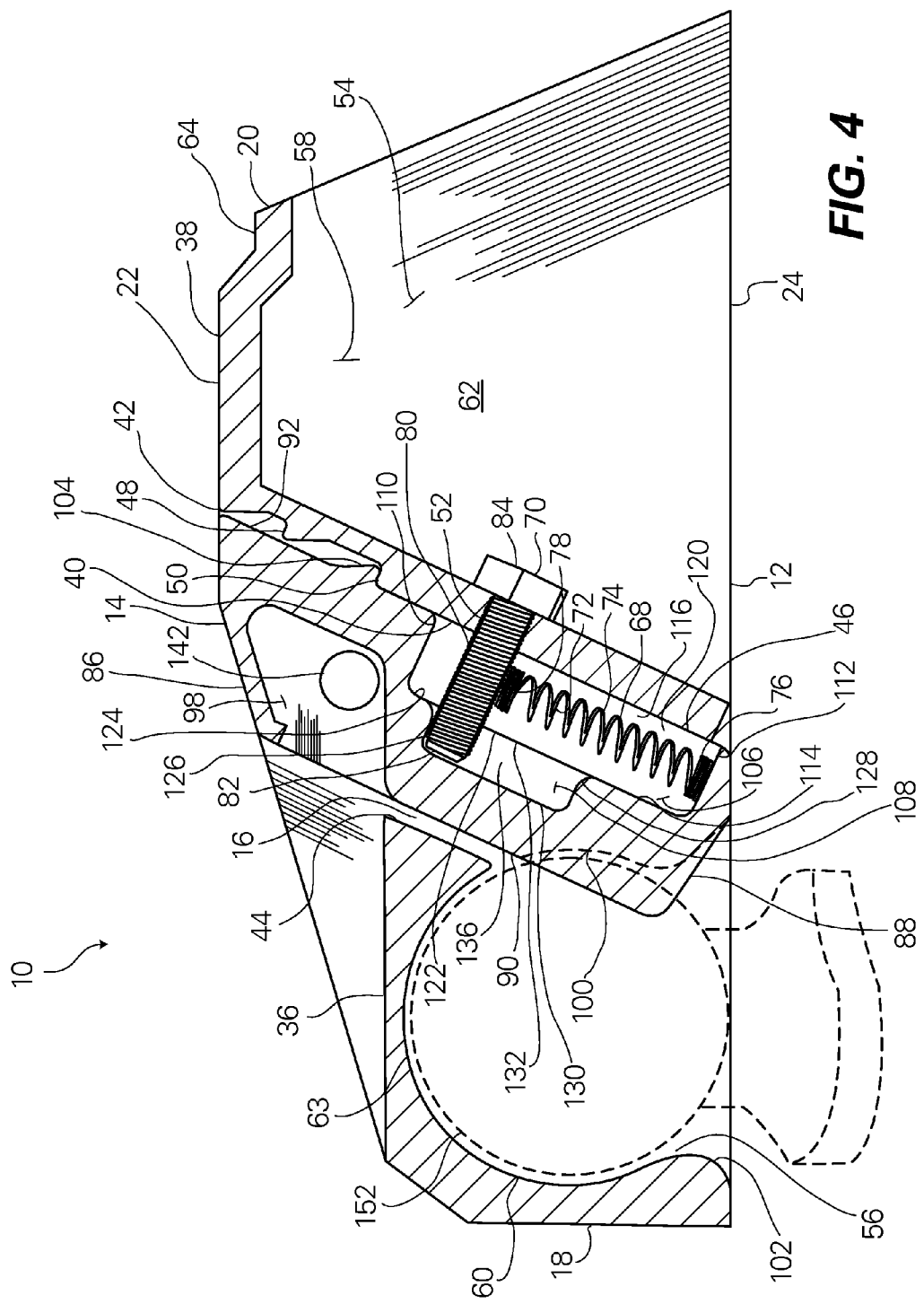
FIG. 4 is a cross-sectional view of the coupler of FIG. 1 having the latch assembly in the closed position.
Figure 5:
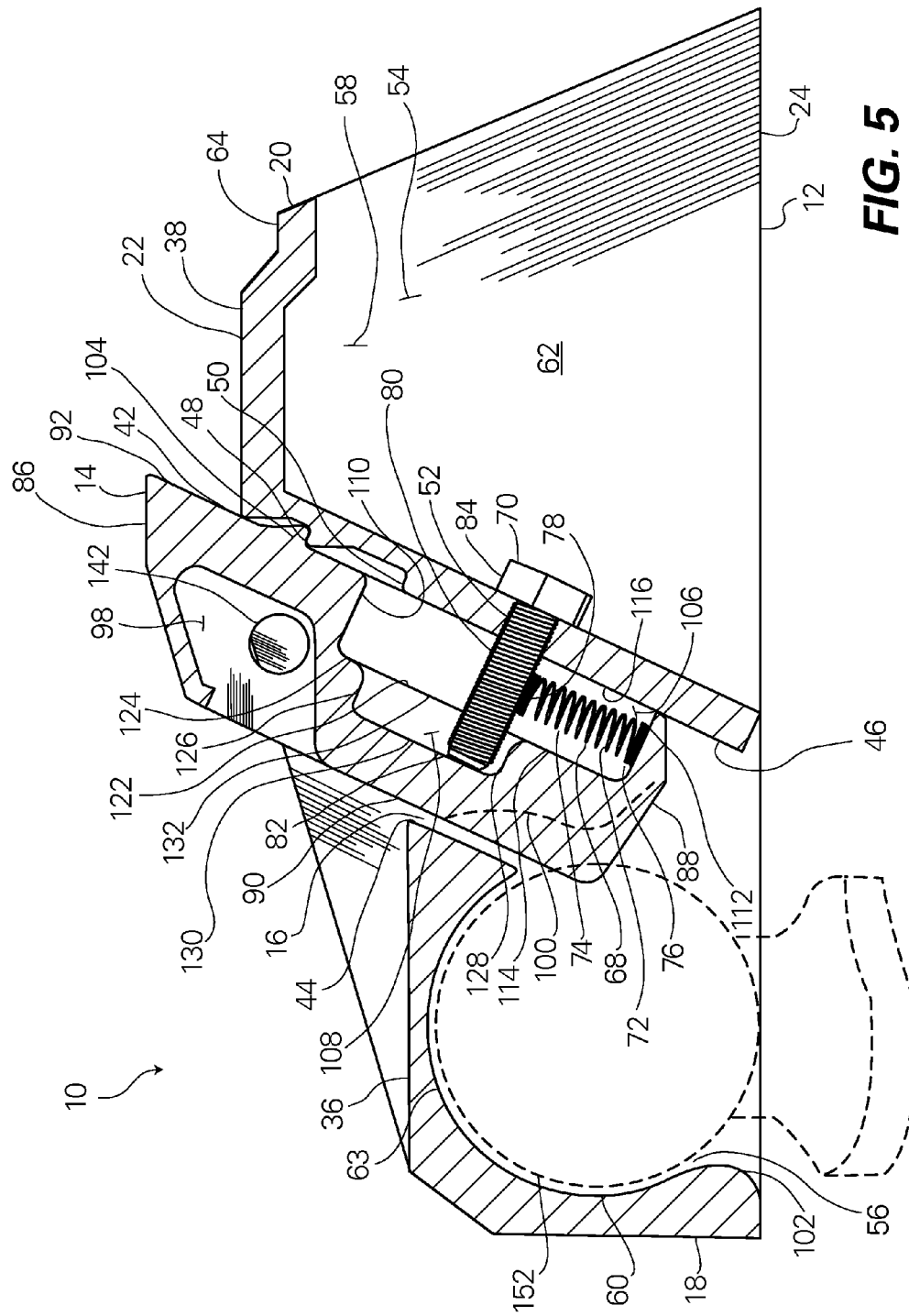
FIG. 5 is a cross-sectional view of the coupler of FIG. 1 having the latch assembly in an open position.

With continuing reference to FIGS. 1-5, coupling the trailer and tow vehicle by means of the coupler 10 is specifically enabled by a latch assembly. The latch assembly comprises the slide 14 and a biasing member 68 which function in cooperation with a retention member 70 affixed to the body 12. The biasing member 68 is preferably an elastic structure and is more preferably a conventional coil spring as shown in FIGS. 4 and 5. The coil spring 68 is an elastic substantially tubular member with an internal longitudinal face 72, an external longitudinal face 74, a lower end 76, and an upper end 78.

Figure 2:
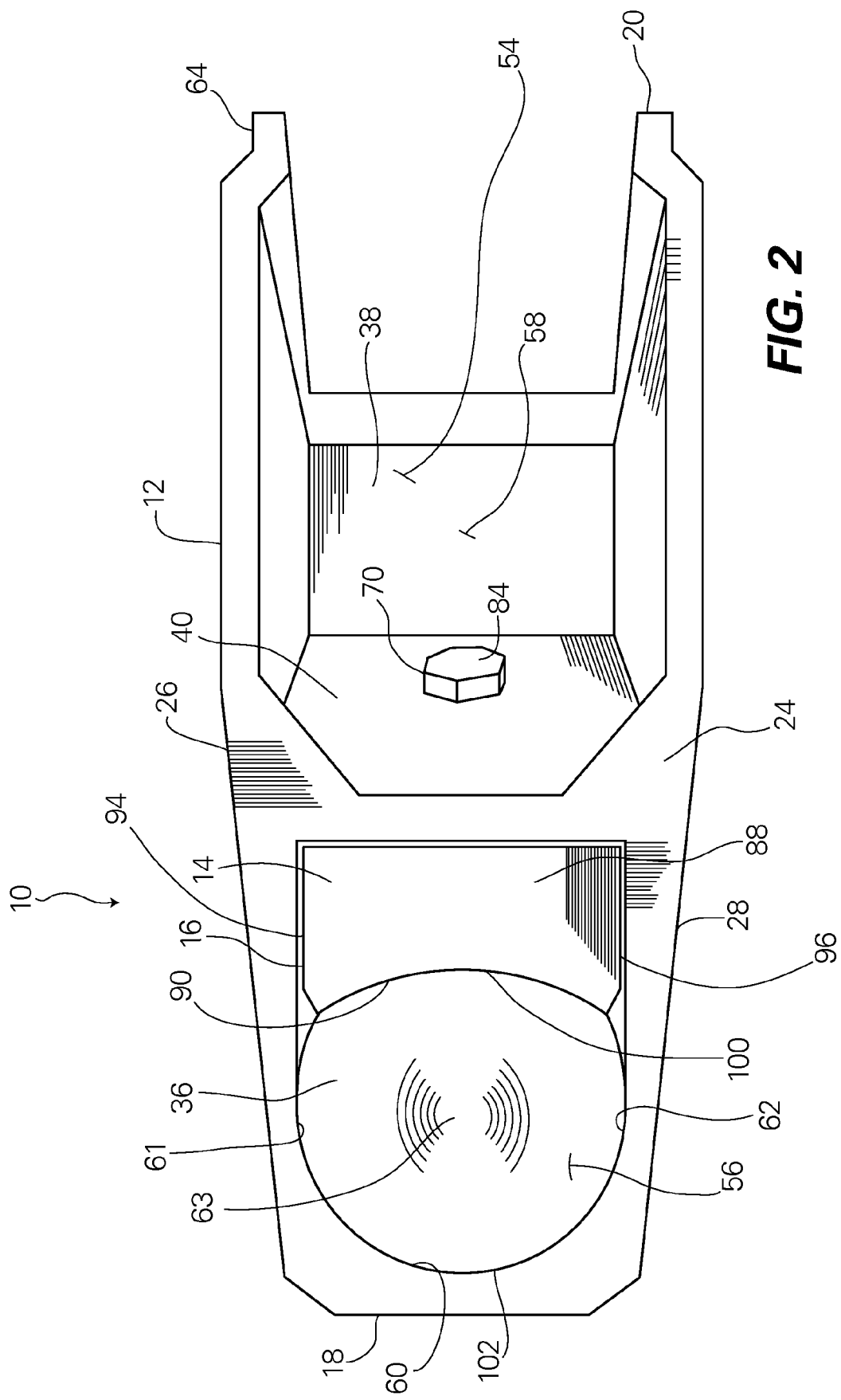
FIG. 2 is a bottom view of the coupler of FIG. 1 having the latch assembly in the closed position.
Figure 3:
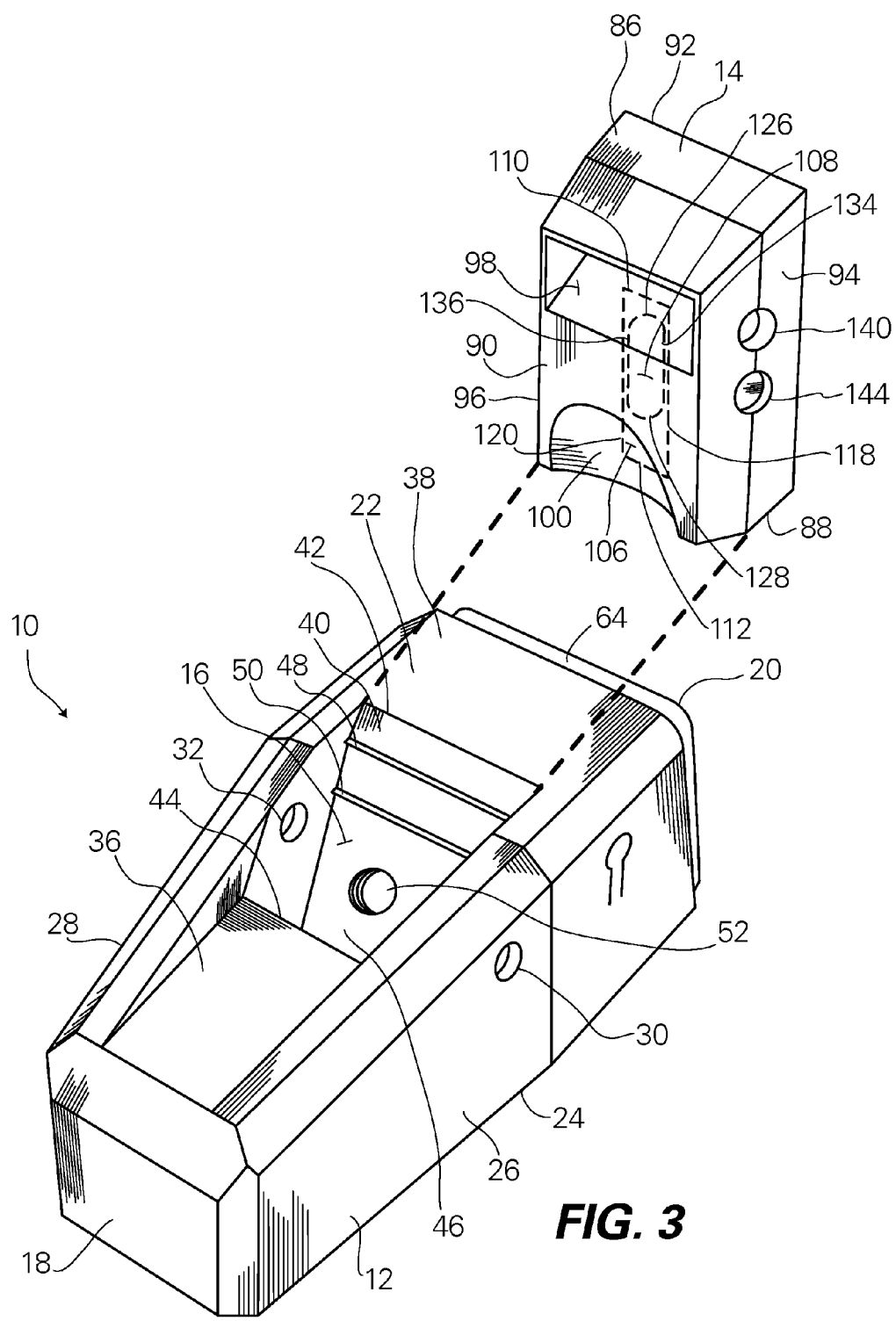
FIG. 3 is an exploded view of the coupler of FIG. 1.

The retention member 70 is preferably a shaft-like structure and is more preferably a conventional fastener in the form of a hex bolt as shown in FIGS. 2, 4 and 5. As such, the hex bolt configuration of the retention member 70 has a male-threaded cylindrical shaft 80 extending from a front end 82 of the retention member 70 to a rear end 84 thereof, which is a hex head. The hex head 84 is cooperatively over-sized relative to the retention bore 52 to prevent the hex head 84 from passing therethrough. The male thread on the shaft 80 is sized to be rotatably received in the female thread of the retention bore 52. It is understood that the term "front end 82" is generally used herein to encompass, not only the substantially vertically-oriented planar front edge of the retention member 70, but also the portion of the substantially horizontally-oriented cylindrical shaft 80 proximal to the front edge of the retention member 70.

The slide 14, like the body 12, has an elongate configuration substantially resembling a rectangular box with six exterior sides. Unlike the body 12, however, the elongate axis of the slide 14 has a substantially vertical orientation. As such, the slide 14 has substantially horizontally-oriented top and bottom ends 86, 88 and substantially vertically-oriented front, rear, first lateral and second lateral sides 90, 92, 94, 96. The vertically-oriented sides 90, 92, 94, 96 of the slide 14 are configured and dimensioned to slidably reside within the slide slot 16. The slide slot 16 is bounded in the front by the rear face 44 of the lower plate 36, in the rear by the front face 46 of the riser plate 40 and on the first and second lateral sides by the inner faces of the first and second lateral plates 26, 28.

The front side 90 of the slide 14 has a finger pull chamber 98 positioned adjacent to the top end 86 of the slide 14. The finger pull chamber 98 is a cavity integrally formed in the planar front side 90 of the slide 14, which is configured as a recessed handle so that a user is able to readily grasp the slide 14 with a finger inserted into the open front of the finger pull chamber 98 and manually displace the slide 14 upward with the inserted finger. As such, the finger pull chamber 98 is a displaceable element of the coupler 10 which is fixed relative to the remaining elements of the slide 14.

The front side 90 of the slide 14 also has a hitch stop 100 positioned below the finger pull chamber 98 adjacent to the bottom end 88 of the slide 14. The hitch stop 100 is a concave arcuate depression integrally formed in the planar front side 90. The rounded configuration of the hitch stop 100 defines a continuous concave semispherical surface enclosing the rear side of the hitch chamber 56 when the slide 14 is selectively aligned with the body 12 in a closed position as shown in FIG. 4 and described in greater detail below.

The concave rounded surface of the hitch stop 100 correspondingly aligns with the concave rounded surfaces of the inner faces 60, 61, 62, 63 of the front plate 18, first lateral side 26, second lateral side 28, and lower plate 36, respectively, to cooperatively form a substantially continuous concave hemispherical surface which defines substantially the entire enclosed boundary of the hitch chamber 56. The arc of the hitch chamber 56 slightly exceeds that of a half sphere so that the bottom edge of the hitch chamber 56 acts as a hitch retention lip 102, extending beneath the lower side of a hitch ball when a hitch ball is positioned in the hitch chamber 56 as described below.

The rear side 92 of the slide 14 has a protruding stop catch 104 integrally formed thereon, which is positioned proximal to the top end 86 of the slide 14. The stop catch 104 is cooperatively configured to be selectively received by the upper or lower stop notch 48, 50 in a manner described below. A biasing chamber 106 is integrally formed as a recessed cavity within the rear side 92 of the slide 14 below the stop catch 104 more proximal to the bottom end 88 of the slide 14.

A retention chamber 108 is also integrally formed as a recessed cavity within the rear side 92 of the slide 14 below the stop catch 104 more proximal to the bottom end 88 of the slide 14. The retention chamber 108 is substantially concentric with the biasing chamber 106, but is positioned more forward of the biasing chamber 106 within the slide 14 (i.e., is positioned more deeply within the slide 14 relative to the rear side 92 than the biasing chamber 106).

The biasing chamber 106 has an elongate configuration substantially resembling a rectangular box with six sides. The elongate axis of the biasing chamber 106 has a substantially vertical orientation. As such, the biasing chamber 106 has substantially horizontally-oriented top and bottom ends 110, 112 and substantially vertically-oriented front, rear, first lateral and second lateral sides 114, 116, 118, 120. The top and bottom ends 110, 112 and first and second lateral sides 118, 120 are fully-enclosed to define top and bottom faces and first and second lateral faces, respectively. The rear side 116 is open while the front side 114 is partially open and partially enclosed. In particular, a portion of the front side 114 is a front side opening 122 which opens into the forwardly-positioned retention chamber 108. The remainder of the front side 114 above and below the front side opening 122 is enclosed to define a front face 124.

The biasing chamber 106 is configured and dimensioned to substantially enclose the biasing member 68 therein when the latch assembly 14, 68 is cooperatively assembled with the body 12 for normal operation of the coupler 10. In particular, the front face 124 and first and second lateral faces 118, 120 of the biasing chamber 106 within the slide 14 forwardly and laterally adjoin the external face 74 of the biasing member 68, respectively, while the bottom face 112 of the biasing chamber 106 engages the lower end 76 of the biasing member 68 such that the slide 14, and more particularly the biasing chamber 106, substantially encloses the biasing member 68 on four sides. The shaft 80 of the retention member 70 engages the upper end 78 of the biasing member 68 and the front face 46 of the riser plate 40 rearwardly adjoins the external face 74 of the biasing member 68 to enclose the biasing member 68 on the remaining two sides and complete enclosure of biasing member 68.

The term "adjoins the external face 74" as used herein means that the recited adjoining element is adjacent and more proximal to the external face 74 than to the internal face 72 of the biasing member 68. Thus, the term "adjoins the external face 74" encompasses the case where the recited adjoining element engages the external face 74 of the biasing member 68 or the case where the recited adjoining element is more proximal to the external face 74, but does not engage the external face 74.

The retention chamber 108 likewise has an elongate configuration substantially resembling a rectangular box with six sides. The elongate axis of the retention chamber 108 has a substantially vertical orientation, but is substantially shorter than that of the biasing chamber 106. In any case, the retention chamber 108 has substantially horizontally-oriented top and bottom ends 126, 128 and substantially vertically-oriented front, rear, first lateral and second lateral sides 130, 132, 134, 136. The top and bottom ends 126, 128, front side 130 and first and second lateral sides 134, 136 are fully-enclosed to define top, bottom and front faces and first and second lateral faces, respectively. The top and bottom faces have a concave curvature in correspondence with the convex curvature of the cylindrical shaft 80 of the retention member 70. The rear side 132 is open into the rearwardly-positioned biasing chamber 106 via the front side opening 122 of the biasing chamber 106.

The retention chamber 108 is configured and dimensioned to substantially enclose the front end 82 of the retention member 70 therein when the latch assembly 14, 68 is cooperatively assembled with the body 12. In particular, top, bottom, front, first lateral and second lateral faces 126, 128, 130, 134, 136 substantially enclose the front end 82 of the retention member 70 on five sides.

The coupler 10 is further optionally provided with a lock pin 138 shown only in FIG. 1 and omitted from the remaining FIGS. 2-5 for clarity. The lock pin 138 is configured and dimensioned to be selectively insertable into or removable from the first and second lock pin apertures 30, 32 in the first and second lateral sides 26, 28, respectively, of the body 12 as well as into or from correspondingly sized and aligned first and second lock pin apertures 140, 142, which extend through the first and second lateral sides 94, 96, respectively, of the slide 14. The cooperative function of the lock pin 138 and lock pin apertures 30, 32, 140, 142 is described below with reference to operation of the coupler 10.

A lock pin indentation 144 is also formed in the first lateral side 94 of the slide 14 which extends partially into, but not entirely, through the first lateral side 94. (Note that there is no corresponding lock indentation required in the second lateral side 96 of the slide 14.) The lock pin indentation 144 is configured and dimensioned so that the lock pin 138 is selectively insertable into or removable from the first lock pin aperture 30 in the body 12 and the lock pin indentation 144 in the slide 14. The cooperative function of the lock pin 138, lock pin aperture 30 and lock pin indentation 144 is likewise described below with reference to operation of the coupler 10.

The lock pin 138 is tethered to the body 12 by means of a flexible leash 146. The leash 146 has one end secured to the lock pin 138 by a leash ring 148 and the other end secured to the body 12 by a leash fastener 150 such as a bolt, screw, rivet, or the like which is fastened to the first lateral side 26 of the body 12. The leash 146 prevents the lock pin 138 from being misplaced when the lock pin 138 is removed from the first and second lock pin apertures 140, 142 of the slide 14 and first and second lock pin apertures 30, 32 of the body 12. Although not shown, the coupler 10 can also optionally be provided with a conventional keyed locking assembly to add a higher level of security to the coupler locking function described below.

Operation of the coupler 10 is described below with initial reference to FIGS. 1, 2 and 4, wherein the latch assembly 14, 68 is shown set in a closed position. The closed latch assembly 14, 68 is the means by which a user is able to securely couple a trailer and a tow vehicle. In particular, the closed latch assembly 14, 68 latches the coupler 10, which is mounted on the front of the trailer, to a conventional hitch ball 152 shown in phantom in FIG. 4, which is conventionally mounted on the rear of the tow vehicle (not shown). The latch assembly 14, 68 effects latching of the coupler 10 to the hitch ball 152 by securely retaining the hitch ball 152 within the hitch chamber 56 of the coupler 10.

The lowered position of the downwardly-biased slide 14, in cooperation with the fixed position of the hitch retention lip 102, prevents inadvertent or otherwise accidental withdrawal of the hitch ball 152 from the hitch chamber 56 once the hitch ball 152 is positioned therein, thereby securing coupling of the trailer and tow vehicle. In particular, the lowered position of the slide 14, and specifically the position of the hitch stop 100, blocks the hitch ball 152 from being displaced rearward in the hitch chamber 56. As such, the lowered position of the slide 14 prevents the hitch ball 152 from clearing the hitch retention lip 102 and being lowered out of the hitch chamber 56 through the open bottom side 24 of the body 12.

The expansion force (alternately termed the biasing force) of the biasing member 68, which resides in the biasing chamber 106 of the slide 14, impedes displacement of the slide 14 from its lowered position when the latch assembly 14, 68 is in its closed position. In particular, the upper end 78 of the biasing member 68 presses against the fixed shaft 80 of the retention member 70 and the lower end 76 of the biasing member 68 presses against the displaceable bottom face 112 of the biasing chamber 106 while the external face 74 of the biasing member adjoins the front face 124 and first and second lateral faces 118, 120 of the biasing chamber 106. Accordingly, the lower end 76 of the biasing member 68 exerts a downward biasing force on the bottom face 112 of the slide 14 which impedes upward displacement of the slide 14 from its lowered position.

Optional utilization of the lock pin 138 shown in FIG. 1 provides a back-up mechanism for preventing inadvertent or accidental withdrawal of the hitch ball 152 from the hitch chamber 56 to further secure coupling of the trailer and tow vehicle. In particular, the lock pin 138 and lock pin apertures 30, 32, 140, 142 function as a mechanism for locking the latch assembly 14, 68 in its closed position, thereby preventing upward displacement of the slide 14 from its lowered position. The upward displacement locking function is effected by selectively inserting the lock pin 138 in series through the first lock pin aperture 30 in the body 12, the first lock pin aperture 140 in the slide 14, the finger pull chamber 98 in the slide 14, the second lock pin aperture 142 in the slide 14, and the second lock pin aperture 32 in the body 12. As a result, the lock pin 138 is in an upward displacement locked position which locks the latch assembly 14, 68 in its closed position and retains the slide 14 in its lowered position.

Operation of the coupler 10 is further described below with reference to FIG. 5, wherein the latch assembly 14, 68 is shown set in an open position after it has been transitioned from its closed position of FIGS. 1, 2, and 4. The open latch assembly 14, 68 is the means by which a user is able to uncouple the trailer and tow vehicle. Transitioning the latch assembly 14, 68 from its closed to its open position is initiated by disabling the upward displacement locking function of the lock pin 138, if the lock pin 138 is in the upward displacement locked position.

The upward displacement locking function of the lock pin 138 is disabled by manually withdrawing the lock pin 138 in series from the second lock pin aperture 32 in the body 12, the second lock pin aperture 142 in the slide 14, the finger pull chamber 98 in the slide 14, the first lock pin aperture 140 in the slide 14, and the first lock pin aperture 30 in the body 12. The user continues transitioning the latch assembly 14, 68 from its closed to its open position by grasping the finger pull chamber 98 with one or more fingers and manually pulling the finger pull chamber 98 upward to overcome the downward biasing force of the biasing member 68.

The upward manual force of the user elastically compresses (i.e., tensions) the biasing member 68 in the biasing chamber 106 while slidably displacing the slide 14 upwardly through the slide slot 16 in a first displacement direction outwardly from the body 12. The front face 46 of the riser plate 40 defines a linear travel track for the slide 14 which has a substantially vertical orientation. Nevertheless, as noted above, the travel track is preferably somewhat slanted at a deviation from true vertical. Upward displacement of the slide 14 in the travel track withdraws the hitch stop 100, which is adjacent to the bottom end 88 of the slide 14, from the hitch chamber 56, thereby removing the hitch stop 100 as the rear boundary of the hitch chamber 56.

The resulting raised position of the slide 14 and corresponding open position of the latch assembly 14, 68 are maintained despite the downward biasing force of the elastically tensioned biasing member 68 by engaging the stop catch 104 with the upper stop notch 48 which prevents downward displacement of the slide 14 in the travel track. The lock pin 138 and lock pin indentation 144 optionally provide an additional redundant back-up mechanism for securely locking the slide 14 in its raised position. In particular, the lock pin 138 and lock pin indentation 144 function as a mechanism for locking the latch assembly 14, 68 in its open position, thereby preventing downward displacement of the slide 14 from its raised position.

The downward displacement locking function is effected by selectively inserting the lock pin 138 in series through the first lock pin aperture 30 in the body 12 and into the lock pin indentation 144 in the slide 14 which correspondingly effects locking the latch assembly 14, 68 in its open position. As a result, the lock pin 138 is in a downward displacement locked position which locks the latch assembly 14, 68 in its open position and retains the slide 14 in its raised position.

The raised position of the slide 14 enables the user to freely withdraw the hitch ball 152 from the hitch chamber 56 of the body 12. In particular, the raised position of the slide 14, and specifically the withdrawal of the hitch stop 100 from the hitch chamber 56, permits the hitch ball 152 to be displaced rearward in the hitch chamber 56. As such, the hitch ball 152 is able to clear the hitch retention lip 102 and be lowered out of the hitch chamber 56 through the open bottom side 24 of the body 12 by the user, thereby uncoupling the trailer and tow vehicle.

With continuing reference to FIG. 5, the latch assembly 14, 68 is readily transitionable from its open position back to its closed position shown in FIGS. 1, 2 and 4 by disabling the downward displacement locking function of the lock pin 138, if the lock pin 138 is in the downward displacement locked position. The downward displacement locking function is disabled by manually withdrawing the lock pin 138 in series from the lock pin indentation 144 in the slide 14 and the first lock pin aperture 30 in the body 12. The user continues transitioning the latch assembly 14, 68 from its open to its closed position by grasping the finger pull chamber 98 and manually pulling the finger pull chamber 98 forward to disengage the stop catch 104 from the upper stop notch 48. Disengagement of the stop catch 104 causes the downward biasing force of the elastically expanding biasing member 68 to automatically slidably displace the slide 14 downwardly through the slide slot 16 in a reciprocating second displacement direction inwardly toward the body 12 which returns the slide 14 to its lowered position and correspondingly returns the latch assembly 14, 68 to its open position.

If desired, the trailer and tow vehicle can be recoupled while transitioning the latch assembly 14, 68 from its open to closed position by reinserting the hitch ball 152 mounted on the tow vehicle into the hitch chamber 56 while the latch assembly 14, 68 is set in its open position. Once the hitch ball 152 is positioned in the hitch chamber 56, the stop catch 104 is manually disengaged from the upper stop notch 48 which automatically returns the hitch stop 100 to the hitch chamber 56 where it reengages the hitch ball 152, thereby restoring coupling of the trailer and tow vehicle.

Alternatively, the trailer and tow vehicle can be recoupled while the latch assembly 14, 68 is set, but not locked, in its closed position and the hitch chamber 56 is unoccupied. The present recoupling method includes a self-latching procedure, which is so termed because the method does not include any direct user manual interaction with the latch assembly 14, 68. As such, the user initiates the recoupling method by aligning the open bottom side of the empty hitch chamber 56 of the coupler 10 over the hitch ball 152 mounted on the tow vehicle and manually lowering the coupler 10 down onto the hitch ball 152. As the user lowers the coupler 10 onto the hitch ball 152, the top of the hitch ball 152 enters the open bottom side of the hitch chamber 56 where it engages the bottom end 88 of the slide 14. The weight of the trailer on which the coupler 10 is mounted drives the coupler 10 further down onto the hitch ball 152.

As the hitch ball 152 moves further into the hitch chamber 56, it simultaneously displaces the slide 14 upward in the slide slot 16 against the downward biasing force of the elastically tensioning biasing member 68. When the hitch ball 152 is completely inserted into the hitch chamber 56 as shown in FIGS. 4 and 5, the hitch ball 152 slides forward into engagement with the inner faces 60, 61, 62, 63 of the front plate 18, first and second lateral sides 26, 28, and lower plate 36, respectively.

The forward position of hitch ball 152 in the hitch chamber 56 frees the top of the hitch ball 152 from engagement with the bottom end 88 of the slide 14 so that it no longer blocks downward displacement of the slide 14. As a result, the downward biasing force of the elastically expanding biasing member 68 automatically displaces the slide 14 downwardly through the slide slot 16 returning the hitch stop 100 to the hitch chamber 56 where it reengages the hitch ball 152. The forward position of hitch ball 152 in the hitch chamber 56 places the front of the hitch ball 152 directly over the hitch retention lip 102 while the rear of the hitch ball 152 adjoins the hitch stop 100, thereby restoring the coupling of the trailer and tow vehicle.

It is apparent that it is operationally desirable to maintain the displaceable slide 14 within the slide slot 16 at all times when transitioning the latch assembly 14, 68 between its closed and open positions or vice versa during operation of the coupler 10. Accordingly, the coupler 10 has two redundant mechanisms shown in FIG. 4 which perform a downward stop function to prevent the downward biasing force of the elastically expanded biasing member 68 from excessively displacing the slide 14 downwardly past a downward displacement limit and out the bottom of the slide slot 16. Each downward stop mechanism serves as a back-up to the other should one fail for whatever reason.

The first downward stop mechanism is a cooperative combination of elements comprising the stop catch 104 on the rear side 92 of the slide 14 and lower stop notch 50 on the front face 46 of the riser plate 40. Engagement of the stop catch 104 with the lower stop notch 50 when lowering the slide 14, prevents the downward biasing force of the elastically expanded biasing member 68 from displacing the slide 14 past the downward displacement limit which essentially corresponds to the lowered position of the slide 14. The second downward stop mechanism is a cooperative combination of elements comprising the front end 82 of the retention member 70 and the top face 126 of the retention chamber 108. Engagement of the top face 126 with the front end 82 when lowering the slide 14, likewise prevents the downward biasing force of the elastically expanded biasing member 68 from displacing the slide 14 past the downward displacement limit.

Conversely, the downward biasing force of the elastically tensioned biasing member 68 resists efforts by the user to displace the slide 14 upwardly out the top of the slide slot 16. The coupler 10 also has a mechanism shown in FIG. 5 which performs an upward stop function should the user manually apply an upward displacement force to the slide 14 which overcomes the downward biasing force of the elastically tensioned biasing member 68. The upward stop mechanism is a cooperative combination of elements comprising the front end 82 of the retention member 70 and the bottom face 128 of the retention chamber 108. Engagement of the bottom face 128 of the retention chamber 108 with the front end 82 the retention member 70 when upwardly displacing the slide 14, prevents the user from excessively displacing the slide 14 upwardly past an upward displacement limit and entirely out the top of the slide slot 16.

While the foregoing preferred embodiments of the invention have been described and shown, it is understood that alternatives and modifications, such as those suggested and others, may be made thereto and fall within the scope of the present invention.

I claim:

1. A trailer coupler comprising:
a fixed body having a slide slot;
a slide displaceable in reciprocating first and second displacement directions within said slide slot, said slide having a slide side with a biasing chamber formed within said slide side, said biasing chamber fixed relative to said slide and having at least two biasing chamber sides;
a biasing member enclosed within said at least two biasing chamber sides, said biasing member biasing said slide in said first displacement direction or said second displacement direction, wherein said biasing member has a first end, a second end opposite said first end and an external face, and wherein said at least two biasing chamber sides are an end side defining an end face and a front side defining a front face, further wherein said end face of said biasing chamber engages said first end of said biasing member and said front face of said biasing chamber adjoins said external face of said biasing member; and
a retention member attached to said body and fixed relative to said body, wherein said retention member extends into said biasing chamber and engages said second end of said biasing member in said biasing chamber.

2. The trailer coupler of claim 1, wherein said biasing member is a coil spring.

3. The trailer coupler of claim 1, wherein said slide has a concave finger pull integrally formed within said slide, said finger pull fixed relative to said slide.

4. The trailer coupler of claim 1, wherein said retention member has a front end, a rear end attached to said body and a shaft extending between said front and rear ends.

5. The trailer coupler of claim 1, wherein said slide has a retention chamber formed within said slide side and said retention chamber is fixed relative to said slide and has a retention chamber end side, further wherein said retention member has a front end and a shaft extending from said front end, said shaft extending into said biasing chamber and engaging said second end of said biasing member in said biasing chamber and said front end of said retention member extending into said retention chamber, wherein said front end engages said retention chamber end side when said slide is displaced in said first displacement direction to a first displacement limit, thereby blocking further displacement of said slide in said first displacement direction, or when said slide is displaced in said second displacement direction to a second displacement limit, thereby blocking further displacement of said slide in said second displacement direction.

6. The trailer coupler of claim 5, wherein said retention chamber is concentric with and shorter than said biasing chamber.

7. The trailer coupler of claim 5, wherein said retention chamber is positioned more forward of said biasing chamber within said slide.

8. The trailer coupler of claim 1, wherein said first displacement direction is a downward displacement direction and said second displacement direction is an upward displacement direction, and wherein said slide has a retention chamber formed within said slide side and said retention chamber is fixed relative to said slide and has a retention chamber top end side and a retention chamber bottom end side, further wherein said retention member has a front end and a shaft extending from said front end, said shaft extending into said biasing chamber and engaging said second end of said biasing member in said biasing chamber and said front end of said retention member extending into said retention chamber, wherein said front end engages said retention chamber top end side when said slide is displaced in said downward displacement direction to a downward displacement limit, thereby blocking further displacement of said slide in said downward displacement direction, and said front end engages said retention chamber bottom end side when said slide is displaced in said upward displacement direction to an upward displacement limit, thereby blocking further displacement of said slide in said upward displacement direction.

9. A trailer coupler comprising:
a fixed body including a slide slot having a substantially vertically aligned slot side;
a slide having a biasing chamber formed therein, said slide having a slide side abutting and aligned substantially parallel to said slot side of said slide slot and said slide displaceable within said slide slot in reciprocating downward and upward displacement directions with said slide side of said slide slidably facing said slot side of said slide slot, wherein said downward displacement direction has a downward displacement limit blocking further displacement of said slide in said downward displacement direction and said upward displacement direction has an upward displacement limit blocking further displacement of said slide in said upward displacement direction;
a biasing member mounted in said biasing chamber biasing said slide in said downward displacement direction;
a first cooperative stop member on said body and a second cooperative stop member on said slide side of said slide, wherein said first and second stop members are selectively engagable with one another when said slide is at or near said upward displacement limit to block biased displacement of said slide in said downward displacement direction, and wherein said first and second stop members are selectively disengagable from one another when said slide is at or near said upward displacement limit to enable biased displacement of said slide in said downward displacement direction.

10. A trailer coupler comprising:
a fixed body having a slide slot;
a slide displaceable in reciprocating first and second displacement directions within said slide slot, said slide having a slide side with a biasing chamber formed within said slide side, said biasing chamber fixed relative to said slide and having an end side defining an end face and a front side defining a front face;
a biasing member enclosed within said end face and said front face of said biasing chamber, said biasing member biasing said slide in said first displacement direction, wherein said biasing member has a first end, a second end opposite said first end and an external face, further wherein said end face of said biasing chamber engages said first end of said biasing member and said front face of said biasing chamber adjoins said external face of said biasing member; and
a retention member attached to said body and fixed relative to said body, wherein said retention member extends into said biasing chamber and engages said second end of said biasing member in said biasing chamber.

11. The trailer coupler of claim 10, wherein said slide has a retention chamber formed within said slide side, said retention chamber fixed relative to said slide and having a retention chamber end side, further wherein said retention member has a front end and a shaft extending from said front end, said shaft extending into said biasing chamber and engaging said second end of said biasing member in said biasing chamber and said front end of said retention member extending into said retention chamber, wherein said front end engages said retention chamber end side when said slide is displaced in said first displacement direction to a first displacement limit, thereby blocking further displacement of said slide in said first displacement direction.

12. The trailer coupler of claim 11, wherein said retention chamber is concentric with and shorter than said biasing chamber.

13. The trailer coupler of claim 11, wherein said retention chamber is positioned more forward of said biasing chamber within said slide.

14. The trailer coupler of claim 10, wherein said first displacement direction is a downward displacement direction and wherein said slide has a retention chamber formed within said slide side and said retention chamber is fixed relative to said slide and has a retention chamber top end side, further wherein said retention member has a front end and a shaft extending from said front end, said shaft extending into said biasing chamber and engaging said second end of said biasing member in said biasing chamber and said front end of said retention member extending into said retention chamber, wherein said front end engages said retention chamber top end side when said slide is displaced in said downward displacement direction to a downward displacement limit, thereby blocking further displacement of said slide in said downward displacement direction.

15. The trailer coupler of claim 10, wherein said second displacement direction is an upward displacement direction, and wherein said slide has a retention chamber formed within said slide side and said retention chamber is fixed relative to said slide and has a retention chamber bottom end side, further wherein said retention member has a front end and a shaft extending from said front end, said shaft extending into said biasing chamber and engaging said second end of said biasing member in said biasing chamber and said front end of said retention member extending into said retention chamber, wherein said front end engages said retention chamber bottom end side when said slide is displaced in said upward displacement direction to an upward displacement limit, thereby blocking further displacement of said slide in said upward displacement direction.

16. The trailer coupler of claim 10 further comprising a first cooperative stop member integrally formed with said body and a second cooperative stop member integrally formed with said slide, wherein said first and second stop members selectively engage one another to provide a displacement stop mechanism for said slide in said first displacement direction or said second displacement direction.

17. A trailer coupler comprising:
a fixed body having a slide slot;
a slide reciprocatingly displaceable in a downward displacement direction and an upward displacement direction within said slide slot, wherein said slide has a slide side with a biasing chamber formed within said slide side, said biasing chamber fixed relative to said slide and having an end side defining an end face and a front side defining a front face, and further wherein said slide has a retention chamber formed within said slide side, said retention chamber fixed relative to said slide and having a retention chamber top end side and a retention chamber bottom end side;
a biasing member enclosed within said end face and said front face of said biasing chamber, said biasing member biasing said slide in said downward displacement direction, wherein said biasing member has a first end, a second end opposite said first end and an external face, further wherein said end face of said biasing chamber engages said first end of said biasing member and said front face of said biasing chamber adjoins said external face of said biasing member; and
a retention member attached to said body and fixed relative to said body, said retention member having a front end and a shaft extending from said front end, said shaft extending into said biasing chamber and engaging said second end of said biasing member in said biasing chamber and said front end of said retention member extending into said retention chamber, wherein said front end engages said retention chamber top end side when said slide is displaced in said substantially downward displacement direction to a downward displacement limit, thereby blocking further displacement of said slide in said downward displacement direction.

18. The trailer coupler of claim 17, wherein said front end of said retention member engages said retention chamber bottom end side when said slide is displaced in said upward displacement direction to an upward displacement limit, thereby blocking further displacement of said slide in said upward displacement direction.

* * * * *